United States Patent [19]

Sturdy

[11] Patent Number: 4,523,564
[45] Date of Patent: Jun. 18, 1985

[54] ROAD AND ENGINE SPEED GOVERNOR
[75] Inventor: Harry D. Sturdy, Wilmington, N.C.
[73] Assignee: Sturdy Truck Equipment, Inc., Wilmington, N.C.
[21] Appl. No.: 459,345
[22] Filed: Jan. 20, 1983
[51] Int. Cl.³ .............................................. F02D 11/10
[52] U.S. Cl. .................................. 123/361; 180/170; 318/628; 123/352
[58] Field of Search ....................... 123/361, 352, 339; 180/170, 176, 178, 179; 318/628, 686, 687

[56] References Cited
U.S. PATENT DOCUMENTS

| 4,090,480 | 5/1978 | Kasiewicz | 123/361 |
| 4,161,994 | 7/1979 | Collonia | 123/361 |
| 4,181,103 | 1/1980 | Kasiewicz | 123/361 |
| 4,192,398 | 3/1980 | Hunt | 180/178 |
| 4,372,265 | 2/1983 | Kasiewicz | 123/352 |
| 4,383,510 | 5/1983 | Nakamura | 123/361 |
| 4,453,517 | 6/1984 | Kasiewicz | 123/352 |
| 4,455,978 | 6/1984 | Atago | 123/339 |

Primary Examiner—Ronald B. Cox
Attorney, Agent, or Firm—Reising, Ethington, Barnard, Perry & Milton

[57] ABSTRACT

A governor is disclosed for governing engine and load speed and which is especially adapted for use with motor vehicles. It comprises an overriding throttle closing device with a linear actuator for moving the device to a position for limiting the engine speed and load speed to governed values. An electronic control circuit comprising a microprocessor operating under program control produces motor control signals for a reversible electric motor which drives the actuator means through a gear train and lead screw. An engine speed signal generator provides an electrical speed signal to the control circuit and a road speed signal generator supplies a load speed signal to the control circuit. When the speed signal exceeds a predetermined value, the control circuit produces motor control signals for operating the motor at full speed to move the actuator to a reference position causing operation in a reference point governing mode. In this mode when the speed signal exceeds the governed value, the control circuit produces motor control circuits for operation of the motor at slow speed in the close throttle direction. When the speed signal is less than the governed speed, the control circuit produces motor control signals for operating the motor at slow speed in the wide open throttle direction. The slow speed of operation is adapted to provide smooth governing action with small overshoot and minimal droop.

12 Claims, 10 Drawing Figures

ROAD AND ENGINE SPEED GOVERNOR

FIELD OF THE INVENTION

This invention relates to engine and load speed governors; more particularly, it relates such governors with an overriding throttle closing means for limiting the flow of energy supplying means to the engine. It is especially well adapted for use on motor vehicles.

BACKGROUND OF THE INVENTION

In many types of motor vehicles it is desirable to provide speed governing to ensure that the road speed does not go above a predetermined limit and that the engine speed is allowed to make only brief excursions above its predetermined limit. The governing system should not unnecessarily restrict either the engine speed or the vehicle speed. Governing systems of this type are known to improve the economy of vehicle operation by reducing fuel comsumption and engine maintenance costs and increased operating life. Further, such systems afford the vehicle driver the convenience of operating the vehicle with a fully depressed throttle to maintain a cruising speed.

It is also desirable to provide an engine and load speed governor which can be installed as an add-on unit either in the factory or in the field without the cost and inconvenience of replacing or modifying the carburetor, ignition system and speedometer cable of the vehicle.

Engine and load speed governors of this general type are known in the prior art. The Sturdy U.S. Pat. No. 4,181,103 discloses a governor of this type which is characterized as a dynamically-surging governor which allows engine speed to oscillate rapidly about its predetermined limit when the vehicle is operated in a lower gear ratio. In the governor of this patent, the throttle limit is driven over a wide range between wide open and the fully closed positions when a predetermined speed is reached.

The governor disclosed in my co-pending application Ser. No. 168,566 allows the engine to be accelerated to its predetermined limit with small overshoot and then it regulates the speed in close approximation to the predetermined speed limit. In this governor, the engine throttle limit is positioned at a reference position, between wide open and close throttle position, when the engine reaches a predetermined speed. In this system, the overriding throttle closing means moves at the relatively fast rate during movement outside a reference zone and at a relatively slow rate within the reference zone.

Electronic control circuits especially adapted for use with governors of the type are disclosed in Kasiewicz Pat. Nos. 4,090,480, 4,257,136 and Ser. No. 167,964.

SUMMARY OF THE INVENTION

In accordance with this invention, an engine governor is provided which provides smooth governing action with a small degree of overshoot and minimal droop. The governor is useful for engine speed and load speed governing; it is especially useful for vehicles for engine and road speed governing. The smooth governing is obtained by moving an overriding throttle limiting means to a reference position when the measured speed exceeds a predetermined value for operation in a reference point governing mode. In this mode, the throttle limiting means is moved at a predetermined slow speed in the close throttle or open throttle direction when the speed is greater or less, respectively, than the governed speed. The slow speed is slow enough that the overriding throttle limiting means will move from its position at the time of speed measurement to a new position in a time interval at least as great as that required for the measured speed to change from its value at the time of speed measurement to a new value corresponding to said new position of the overriding throttle limiting means.

Further, in accordance with this invention, an engine governor for engine and load speed governing has electrical inputs exclusively and has a mechanical output for positioning the overriding throttle limiting means. This is accomplished by an electronic logic means adapted to receive an electrical engine speed signal and an electrical load speed signal and including means for determining the direction and speed of movement of the overriding throttle limiting means to achieve smooth governing. The governor also includes a switch plate with fixed electrical contacts connected with the electronic circuit and a movable contact which is movable with the actuator member for the overriding throttle limiting means. The governor further includes a reversible electrical motor which drives a linear actuator including the actuator member, the motor being energizable in either direction at full speed or at selectable slow speeds in accordance with motor control signals produced by the logic means. When the measured speed exceeds a predetermined value, the motor is energized to move the actuator member at full speed to a reference position for operation in a reference point governing mode. In this mode, the logic means produces motor control signals for operation of the motor at slow speed towards wide open throttle or close throttle according to the deviations of the speed signal from the governed speed.

Further, in accordance with this invention, the governor is adapted to provide engine speed governing with the engine running in an unloaded condition with quick response to engine overspeed. This is accomplished by logic means which energizes the motor to move the actuator member to an intermediate position between wide open throttle and the reference position when the engine is running without load. Logic means then energizes the motor to move the actuator member to the reference position when the engine speed exceeds the governed value or when engine acceleration exceeds a predetermined value. Also, the governor operates to govern engine speed when the engine is operated in a loaded condition. This is accomplished by the logic means causing the motor to be energized to move at high speed to the reference position when the engine speed exceeds a call-in value or the engine is accelerated above a predetermined value. Also, the governor operates to govern the load speed. This is accomplished by the logic means causing the motor to move the actuator member to the reference position when the load speed exceeds a call-in value.

Further, in accordance with this invention, the governor comprises a linear actuator driven by a reversible electric motor under the control of logic means for positioning an overriding throttle limiting means. The motor is coupled with the actuator member by a gear train and a lead screw. A switch plate containing fixed electrical contacts is disposed adjacent the actuator member. The actuator member carries a movable contact adapted to engage the fixed contact. The motor, gear train, lead screw and actuator member are mounted in the base of a housing and the switch plate is adjustably mounted on the base for adjustment relative to the actuator member. An electronic circuit board is disposed within the housing. The governor is self-contained within the single housing which receives electrical input speed signals and produces mechanical output for positioning the overriding throttle limiting means.

Further, the governor of this invention, is adapted for either engine speed or load speed governing or both. It is especially adapted for use on motor vehicles for engine and road speed governing to prevent engine overspeeding and to limit the road speed to a governed value. It is operable as a cruise control system to maintain a desired road speed by operating the accelerator pedal to its fully depressed position.

A more complete understanding of this invention may be obtained from the description that follows taken with the accompanying drawings.

BEST MODE FOR CARRYING OUT THE INVENTION

Figure 1:
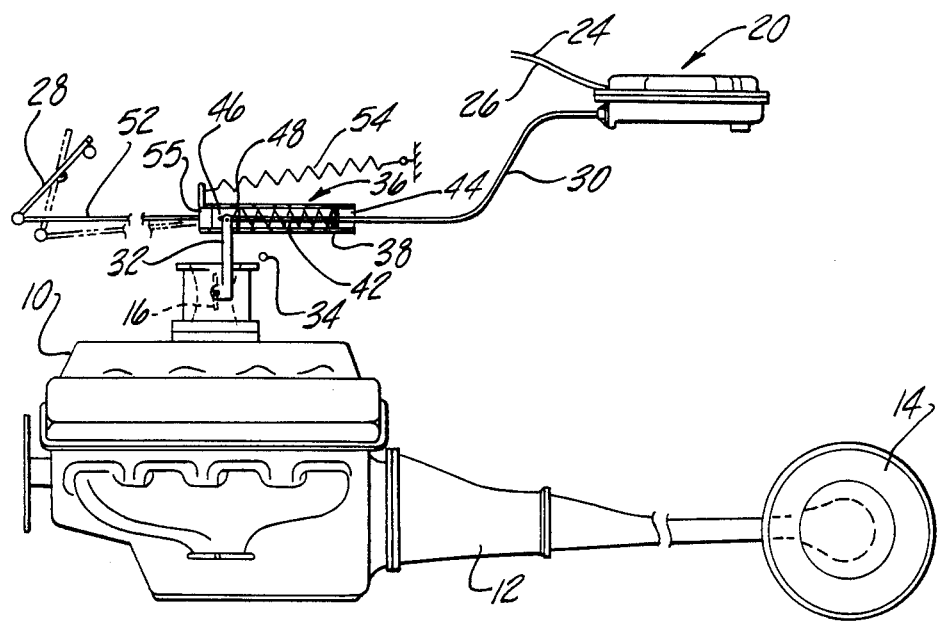
FIG. 1 shows the governor of this invention in a vehicle installation.

Referring now to the drawings, there is shown an illustrative embodiment of the invention in an engine speed and load speed governor especially adapted for motor vehicles. As used herein, the term load or load speed refers to the load which is driven by the engine; in the case of a motor vehicle the load speed is the same as the road speed. It will be appreciated, as the description proceeds, that the governor of this invention is useful in applications other than motor vehicles and may be implemented in forms different from the illustrative embodiment.

Referring now to FIG. 1, the governor of this invention as depicted in a typical vehicle installation. In such a vehicle installation, the governor is adapted to limit the road speed to a prescribed safe speed such as 55 miles per hour. A governor is also adapted to limit the engine speed so that it does not exceed a maximum safe speed, such as 4300 RPM, except for brief excursions.

In FIG. 1, a truck is represented by an internal combustion engine 10 which is connected through a power transmission 12 with the drive wheels 14. The engine is provided with a carburetor, including a throttle plate 16, for regulating the flow of fuel to the engine. The transmission provides different ratios of speeds between the engine and the drive wheels. Typically, with a manual transmission in a truck, the transmission is shifted into low gear to start the vehicle at low speeds from a standing start. In the low gear, the engine can operate at high speed and the gear reduction of the transmission supplies a very high torque to the drive wheels to accelerate the vehicle. As the vehicle speed increases, the transmission should be shifted to a higher gear ratio before the engine reaches its safe limiting speed. When the shift occurs, a lower engine speed will maintain the same vehicle speed and the engine speed and road speed are gradually increased until the engine speed again approaches the limiting value. This process of accelerating the engine and then upshifting the transmission is continued until the transmission is in high gear and the truck is running at a desired road speed.

It will be appreciated that in the normal operation of a vehicle, engine overspeeding tends to occur while operating in the lower gear ratios of the transmission. Also, the engine is especially susceptible to overspeeding when the transmission is in neutral so that the engine is unloaded. Vehicle overspeeding tends to occur when the transmission is in high gear. Thus, the governor must selectively respond to both engine speed and road speed to maintain each of them within safe limits at all times.

Referring further to FIG. 1, the governor 20 of this invention receives engine speed and road speed information and imposes a limit on the throttle opening of the engine to limit the engine speed and road speed to respective governed values. The governor has an electrical input 24 connected with an engine speed signal generator, which is coupled with the ignition coil in a spark ignited engine, to derive an engine speed signal. It also has an electrical input 26 connected with a road speed signal generator which is driven by the output shaft of the transmission to produce a road speed signal. The governor is mechanically connected by a cable 30 with the throttle plate 16 of the engine carburetor to limit the opening of the throttle. The primary control of throttle plate movement remains under the control of the driver by the accelerator pedal 28. A throttle arm 32 is connected with the throttle plate 16 for angular movement thereof about the throttle plate shaft. With the throttle plate in the idle position, the throttle arm 32 engages an idle stop 34. In order to limit the movement of the throttle arm 32 by the accelerator pedal, an override device 36 is provided. It is a lost motion device which comprises a tubular body 38 containing a spring 42 seated against the end 44 of the body. The cable 30 is connected with the other end of the spring 42 and the cable sheath is connected with the end 44 of the body. The throttle arm 32 is connected by a ball stud 46 with the cable end 48. The accelerator pedal 28 is connected by a linkage rod 52 with the other end 44 of the body. An idle return spring 54 acting on the body 38 biases the accelerator pedal 28 and the throttle plate 16 toward the idle positions.

The accelerator pedal, as shown in FIG. 1, is in the wide open or full throttle position, i.e. it is fully depressed by the driver of the truck against the pedal stop. The cable 30 is in an extended or wide open throttle position and does not limit the movement of the throttle arm 32. When the accelerator pedal is depressed, the override device 36 is moved by the rod 52 and the throttle arm 32 moves with it toward the wide open throttle position and the idle spring is extended. When the pedal is released, the idle spring causes the throttle arm 32 to move to its idle position against the idle stop 34. The movement of the override device 36 is accommodated by the flexing of the sheath of the cable 30.

When the cable 30 is in a retracted position between wide open throttle and close throttle, the spring 42 is compressed between the cable end 48 and the end 44 of the body 38. The ball stud moves with the cable end and sufficient movement of the cable end will cause the throttle arm 32 to reach the idle stop 34, even though the pedal is held in its wide open position by the driver.

Thus, the accelerator pedal and the carburetor linkage will function as in a typical ungoverned carburetor so long as the cable end 48 is in its extended or wide open throttle position. This will occur at engine and road speeds below the governed speeds. However, when the cable 30 is retracted toward the close throttle position, the normal throttle control by actuation of the pedal 28 will be overridden and the movement of the throttle plate 16 will be limited in its open throttle direction according to the extent of movement of the cable end 48. Another form of override device is described in Sturdy U.S. Pat. No. 4,362,138 and may be used in place of override device 36.

Figure 2:
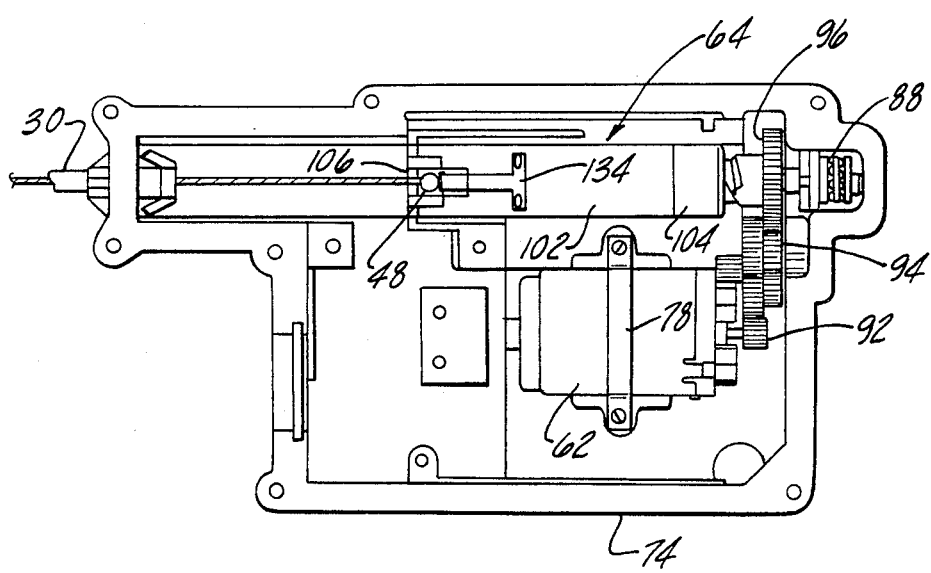
FIG. 2 shows a plan view of the governor with parts removed.
Figure 3:
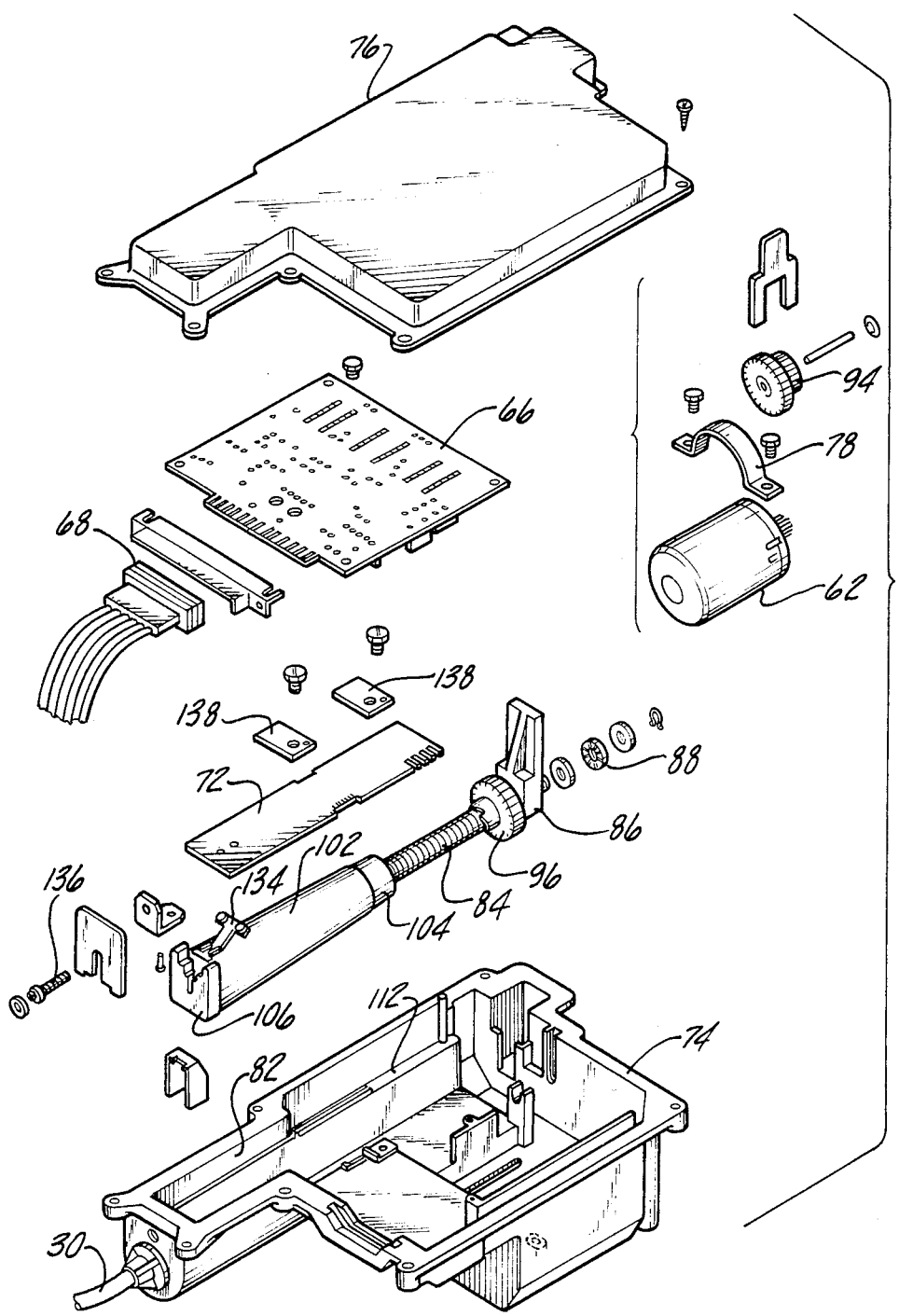
FIG. 3 is an exploded view of the governor.

The governor 20 is shown in detail in FIGS. 2 and 3. It comprises, in general, a reversible electrical motor 62 which is drivingly connected with a linear actuator 64 for displacing the cable 30. The governor also includes an electrical control circuit 66 which has input and output ports connected through a connector 68 to external points. A switch plate 72 coacts with the linear actuator and is electrically connected with the circuit 66.

In greater detail, the governor comprises a housing with a pan-shaped base 74 and a cover 76. The reversible electric motor 62 is a DC permanent magnet motor which is mounted on the base 74 and secured thereto by a retainer 78. The linear actuator 64 is disposed in an elongated channel 82 in the base 74. It comprises a lead screw 84 which is mounted for rotation in a main bearing 86 and is seated against a thrust bearing 88. The motor 62 is drivingly connected with the lead screw 84 through a gear train including a drive pinion 92 on the motor, jack shaft gears 94 and a drive and stop gear 96 on the lead screw. The jack shaft gears 94 are held in place by a jack shaft retainer 98.

The linear actuator 64 further comprises an actuator member 102 which is mounted on a lead screw by a drive nut 104 which is nonrotatively secured to the actuator member. The outer end of the actuator member is provided with a cable connector 106 which receives the cable end 48 of the cable 30. A bridging contact 134 is mounted on the actuator member 102 and coacts with the switch plate 72. In this arrangement, rotation of the motor 62 in a clockwise direction (viewed from the pinion gear end) causes the lead screw to rotate in the clockwise direction and advance the drive nut 104 and hence the actuator member 102 to the right (as viewed in FIG. 2), thus retracting the cable 30 into the housing. When the motor is rotated in the counterclockwise direction, the actuator member 102 is moved to the left (as viewed in FIG. 2) and the cable 30 is extended, i.e. pulled out of the housing by the spring 42 in the override device 36.

Figure 6:
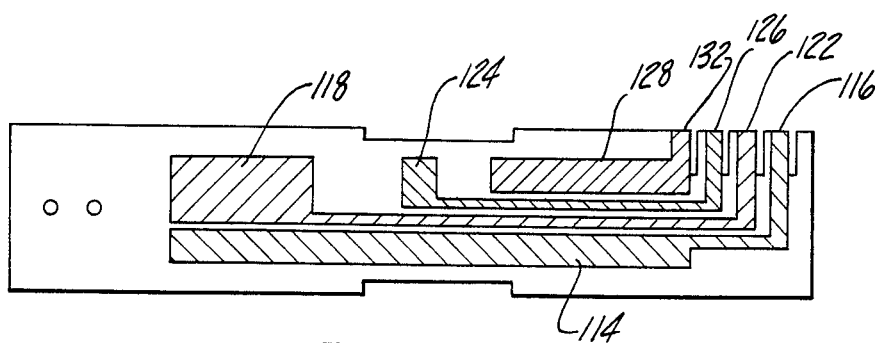
FIG. 6 shows a part of the governor.

The switch plate 72 as shown in FIGS. 3 and 6 is mounted on a shoulder 112 in the elongated channel 82 in the base 74. The switch plate 72 comprises a printed circuit board with a set of conductive paths adjacent the linear actuator 64. As shown in FIG. 6, the switch plate comprises an elongated ground contact 114 having a terminal 116. It also comprises a wide open throttle contact, herein called a wot-1 contact 118 having a terminal 122. The switch plate also includes an intermediate contact, herein called a wot-2 contact 124 having a terminal 126 and a reference contact 128 having a terminal 132. The bridging contact 134 is adapted to bridge between the ground contact 114 and the wot-1 contact 118, the wot-2 contact 124 and the reference contact 128 as the actuator member 102 is moved axially by the lead screw. The switch plate 72 may be adjustably positioned along the axis of the actuator member 102 by means of an adjusting screw 136 and secured in place by a pair of clamps 138. The adjustment of the switch plate permits an initial setting of the linear position of the reference contact 128 (and hence the wot-1 and wot-2 contacts) in relation to the throttle limit position established by the position of the actuator member 102. This permits calibration of the governor for a particular vehicle installation, as will be further understood from the description that follows.

Figure 4:
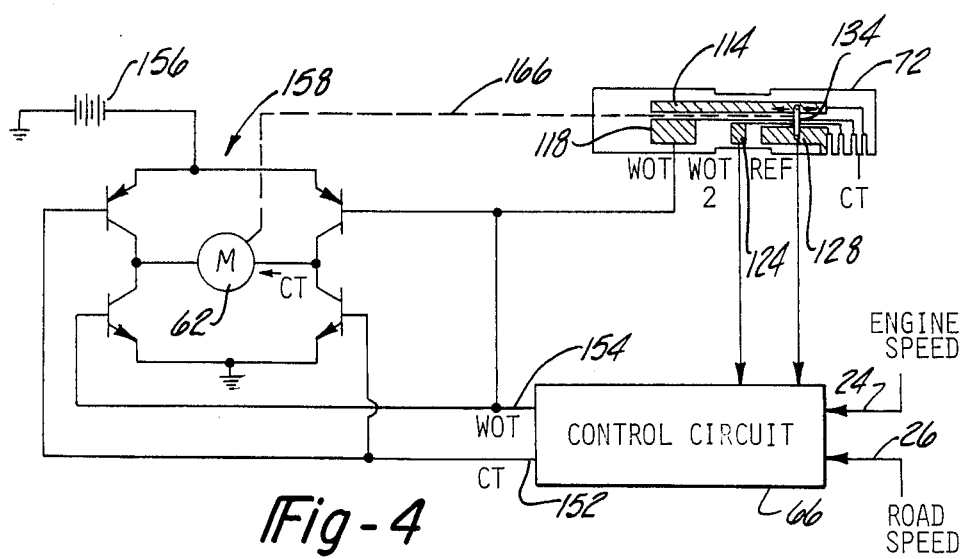
FIG. 4 is a schematic of the governor circuit.

The governor 20 is shown diagramatically in FIG. 4. The electronic control circuit 66 receives the engine speed signal at input port 24 and the road speed signal at input port 26. In response to the speed signals and other inputs to be described, the electronic control circuit 66 develops motor control signals for controlling the reversible motor 62. A close throttle motor control signal CT is developed at output port 152 and an open throttle control signal WOT is developed at output port 154. The motor 62 is energized from the vehicle battery 156 through a motor driver circuit 158. The close throttle signal CT and the open throttle control signal WOT are applied to the driver circuit 158. The bridging contact 134 (mounted on the actuator member 102) is shown in FIG. 4 as being connected with the motor 62 through a mechanical drive coupling 166. The actuator member 102 is, as previously described, connected through the cable 30 to the throttle arm 32. The bridging contact 134 is adapted to connect the reference contact 128 to the gound contact 114 or to connect the wot-2 contact 124 to the ground contact 114 or to connect the wot-1 contact 118 to the ground contact 114 depending upon the position of the actuator member 102. When the bridging contact 134 engages the reference contact 128, a reference position signal is supplied to an input port 168 on the control circuit 66. Similarly, when the bridging contact 134 engages the wot-2 contact 124, the wot-2 position signal is supplied to an input port 172 on the control circuit 66. When the bridging contact 134 engages the wot-1 contact 118 a wot-1 position signal is applied to the control circuit 66 by grounding the output port 154.

Figure 5:
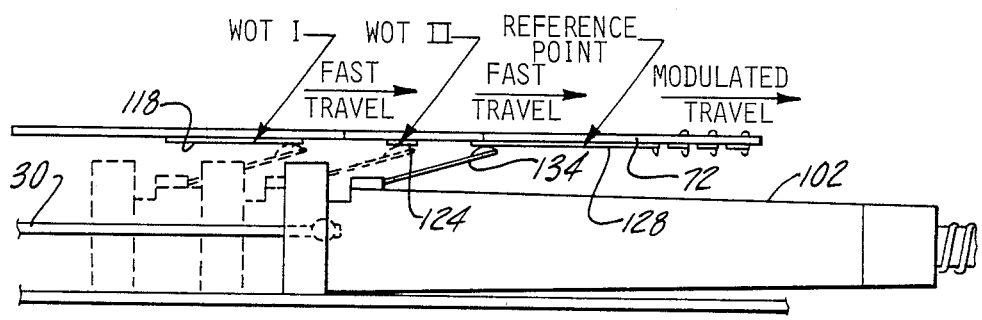
FIG. 5 shows a portion of the actuator in alternate positions.

It will be appreciated that the actuator member 102 is movable by the motor 62 over a range of movement extending between the CT (close throttle) position as indicated in FIG. 4 and the wot-1 (wide open throttle) position. The actuator member 102 and the switch plate 72 are shown in FIG. 5 with the actuator member in alternate contact engaging positions. With the actuator member 102 in the wot-1 position the bridging contact 134 engages the wot-1 contact 118, the accelerator pedal is allowed to actuate the throttle plate to full wide open throttle. The actuator member 102 is moved to this position for starting the engine, dechoking the carburetor and under certain vehicle operating conditions in which full engine power should be allowed. As noted in FIG. 6, the actuator member 102 is moved between the wot-1 position and the wot-2 position by high speed motor operation. Movement from wot-1 to wot-2 upon engine start-up with the transmission in neutral for operation of the governor in a neutral mode which will be described subsequently. Movement of the actuator member from the wot-2 to the wot-1 takes place when the vehicle speed is increased to a certain value, say 8 miles per hour and movement from wot-1 to wot-2 when the vehicle speed is decreased to a certain lower value, say 4 miles per hour. As further indicated in FIGURE, the actuator member 102 is moved by high speed motor operation to the reference position from either the wot-1 position, the wot-2 position or any intermediate position. This occurs when the engine speed exceeds an engine call-in value, say 275 RPM below the engine governed speed. This puts the governor in the engine governing mode, as will be described subsequently. This movement to the reference position also occurs when the road speed exceeds the road speed call-in value, say 2 miles per hour below the governed road speed. This places the governor in the road speed governing mode which will be described subsequently. Movement of the actuator member 102 from the wot-2 position to the reference position also occurs with the governor in the neutral mode when the engine speed exceeds the governed value or when the engine acceleration exceeds a certain value (precall activated), as will be described subsequently. When the actuator member 102 has reached the reference position, a reference position signal is applied to the control circuit 66 which is conditioned in response to the signal for producing motor control signals which are modulated to provide low speed motor operation in either the close throttle or open throttle direction, depending upon whether the speed is above or below the governed value. When the governor is operating in either the neutral mode or the engine governing mode, after the reference position has been reached, the motor will be operated at high speed to the wot-1 position if the engine speed falls below a drop-out value, say 450 RPM lower than the governed value. Similarly, when the governor is operating in the road speed governing mode, after the reference position has been reached, the motor will be operated at high speed to the wot-1 position if the road speed falls below the drop-out value, say 4 miles per hour below the governed value.

Figure 7:
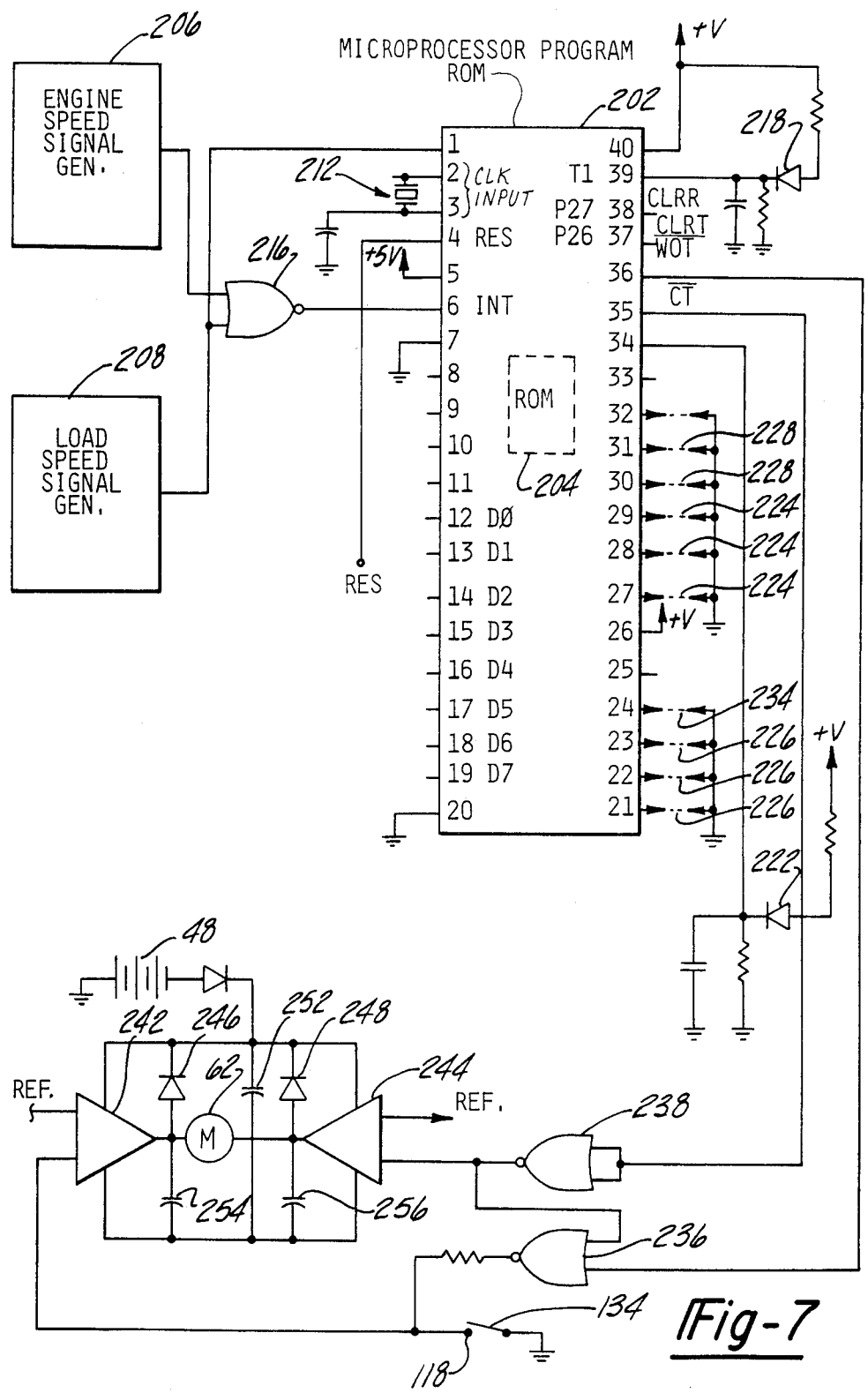
FIG. 7 is a schematic of the electrical circuit of the governor.

The electronic control circuit 66 will now be described with reference to FIG. 7. The control circuit 66 comprises a microprocessor 202 which operates under program control and which includes a read only memory 204 which stores the operating program of the microprocessor. An engine speed signal generator 206 and a road speed signal generator 208 supply respective engine speed and road speed signals to the microprocessor. The reversible motor 62 is coupled with a motor driver circuit 158 which receives motor control signals from the microprocessor.

The microprocessor 202 is an integrated circuit chip with a self-contained read only memory 204 for storing the program of the microprocessor. It is a conventional integrated circuit chip, sometimes called a single-chip processor, type number 8048 and available from Intel Corporation. The program stored in the read only memory 204 is represented by the flow chart of FIG. 8. The microprocessor is provided with a clock 212 which is connected to pins 2 and 3. The supply voltage for the microprocessor is connected to pin 40 and the pin 20 is connected to ground.

The engine speed signal from the signal generator 206 is applied to one input of a NOR gate 216 which has its output connected to the interrupt pin 6 of the microprocessor. The road speed signal from the signal generator 208 is applied to the other input of the NOR gate 216. The road speed signal is also applied to pin 1 of the microprocessor for the purpose of distinguishing the road speed signal from the engine speed signal. A reset signal is applied to pin 4 to ensure that the microprocessor is reset on power-up or in the event that the supply voltage falls below a predetermined level. Pins 5, 7 through 19 and 25, 26 and 33 are not used. A clear signal CLRR is developed on pin 38 of the microprocessor and is applied to the road speed signal generator 208 for use in the speed computation as performed by the microprocessor. Similarly, a clear signal CLRT is developed on pin 37 and applied to the engine speed generator 206. The reference contact 128 on the switch plate 72 is connected through a pulldown circuit 218 to pin 39. Similarly, the wot-2 contact 124 on the switch plate 72 is connected through a pull-down circuit 222 to the pin 34. The microprocessor operates under program control to develop a wide open throttle signal (wot signal) on pin 36. A close throttle signal (CT signal) is developed on pin 35. The wot signal on pin 36 and the CT signal on pin 35 are applied to the motor driver circuit 158, as will be described subsequently.

The microprocessor includes programmable inputs which are used for establishing the parameters of a particular vehicle installation. Such parameters include the values of road speeds and engine speeds for the governing operation. In particular, pins 27, 28 and 29 are used for programming in up to eight different road speed values, such programming being effected by removing or leaving in the removable grounding links 224. Similarly, pins 21, 22 and 23 are used for programming up to eight different engine speeds by the grounding links 226. Additionally, pins 30 and 31 are used for programming, by links 228, in the number of cylinders of the internal combustion engine, the two binary bits being sufficient for coding two, four, six or eight cylinders. Pin 24, with links 232, is alternately set for inhibiting the input of the road speed signal so that the governor responds only to the engine speed signal set to enable the neutral mode of operation. Pin 32 with links 234 is used for optionally selecting the precall activation which may be used in the neutral mode for providing governor response to a predetermined value of engine acceleration, as will be described subsequently.

The motor driver circuit 158 receives the motor control signals, i.e. the wot signal on pin 36 and the CT signal on pin 35 through a pair of logic gates 236 and 238, respectively. The motor driver circuit 212 is a so called half-H circuit of known design. It includes a pair of amplifiers 242 and 244 which are adapted to reversibly energize the motor 62 in accordance with the motor control signals. The output of the amplifier 242 is connected to one motor terminal and the output of amplifier 244 is connected with the other motor terminal. A pair of fast switching diodes 246 and 248 are connected between the motor voltage supply terminal and the respective motor terminals to dissipate the inductive transient voltages arising from motor energization. A capacitor 252 is connected across the supply voltage terminal and ground and capacitors 254 and 256 are connected respectively from the motor terminals to ground for the purpose of slowing down the motor switching action to inhibit oscillations in the circuit.

The microprocessor, under program control, causes the wide open throttle signal (wot signal) at pin 36 to go to logic low when program execution calls for moving the actuator member 102 of the governor toward the wide open throttle position. Thus, when the wot signal is at logic low, the motor 62 is to be energized for rotation in the counterclockwise direction. The microprocessor under program control, causes the close throttle signal (CT signal) at pin 35 to go to logic low when program execution calls for the actuator member 102 to be moved toward the close throttle position, i.e. the motor is to be energized in the clockwise direction. The wot signal from pin 36 is applied to one input of the NOR gate 236 and is inverted at the output of this gate. The output of the gate 236 is applied through a resistor 258 to the signal input of the amplifier 244. The reference input of the amplifier 244 is connected to a reference voltage source. The CT signal from the pin 35 is applied to both inputs of the NOR gate 238 and this gate functions to invert the signal at the output. The output of the gate 238 is applied to the signal input of the amplifier 244. The reference input of amplifier 244 is connected to the reference voltage source. The output of the gate 238 is also connected to the other input of the NOR gate 236 to ensure that the outputs of the gates 236 and 238 will always be in opposite logic states. The wot-1 contact 118 on the switch plate 72 is connected to the signal input of the amplifier 242 through a conductor 262 so that this input is grounded when the bridging contact 134 engages the wot-1 contact. Thus, the bridging contact 134 and wot-1 contact 118 serve as a limit switch to shut off the motor when the wot-1 position is reached.

Figure 8:
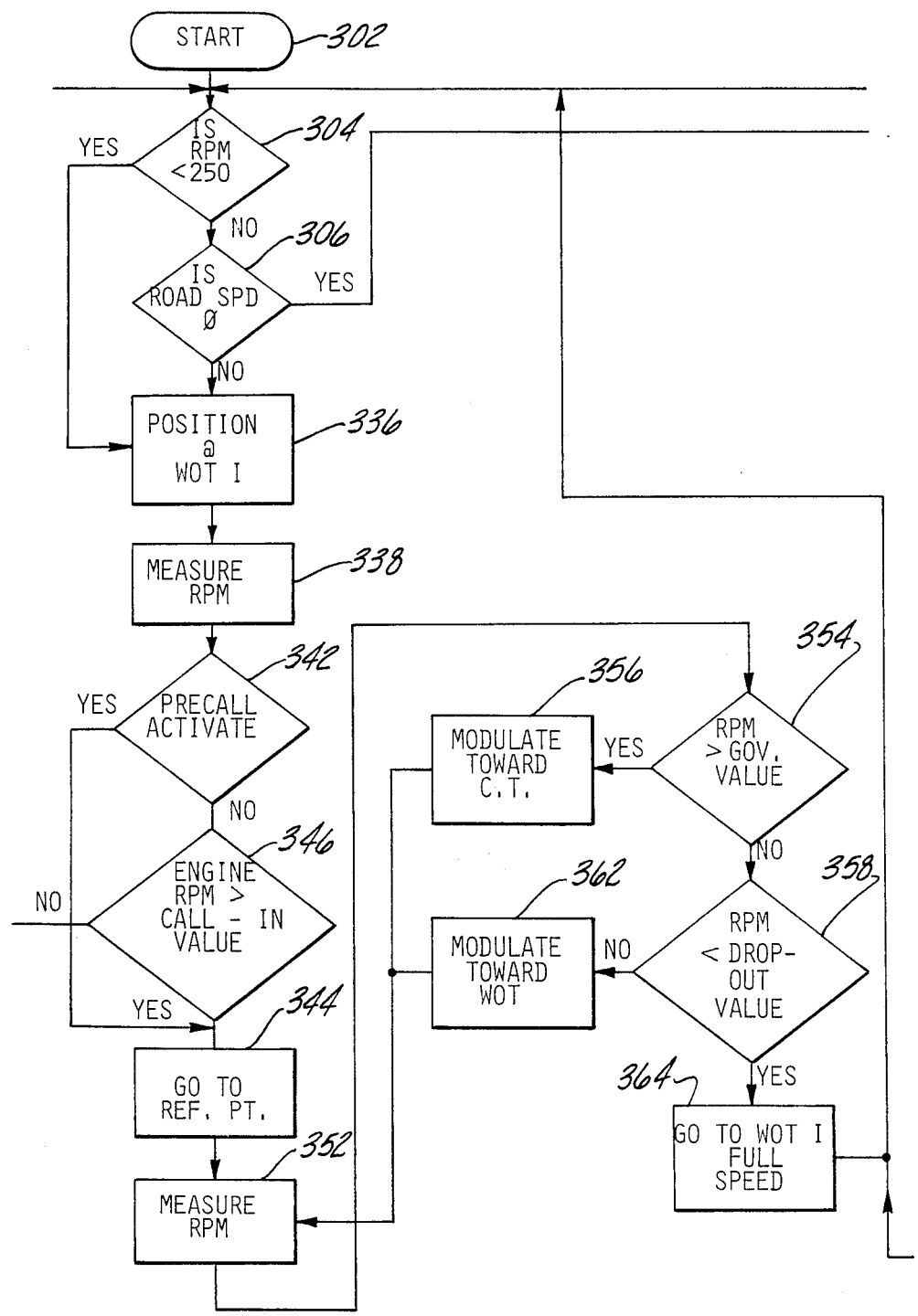
FIGS. 8, 8A and 8B collectively show a flow chart representing the program of the microprocessor in the governor.
Figure 8A:
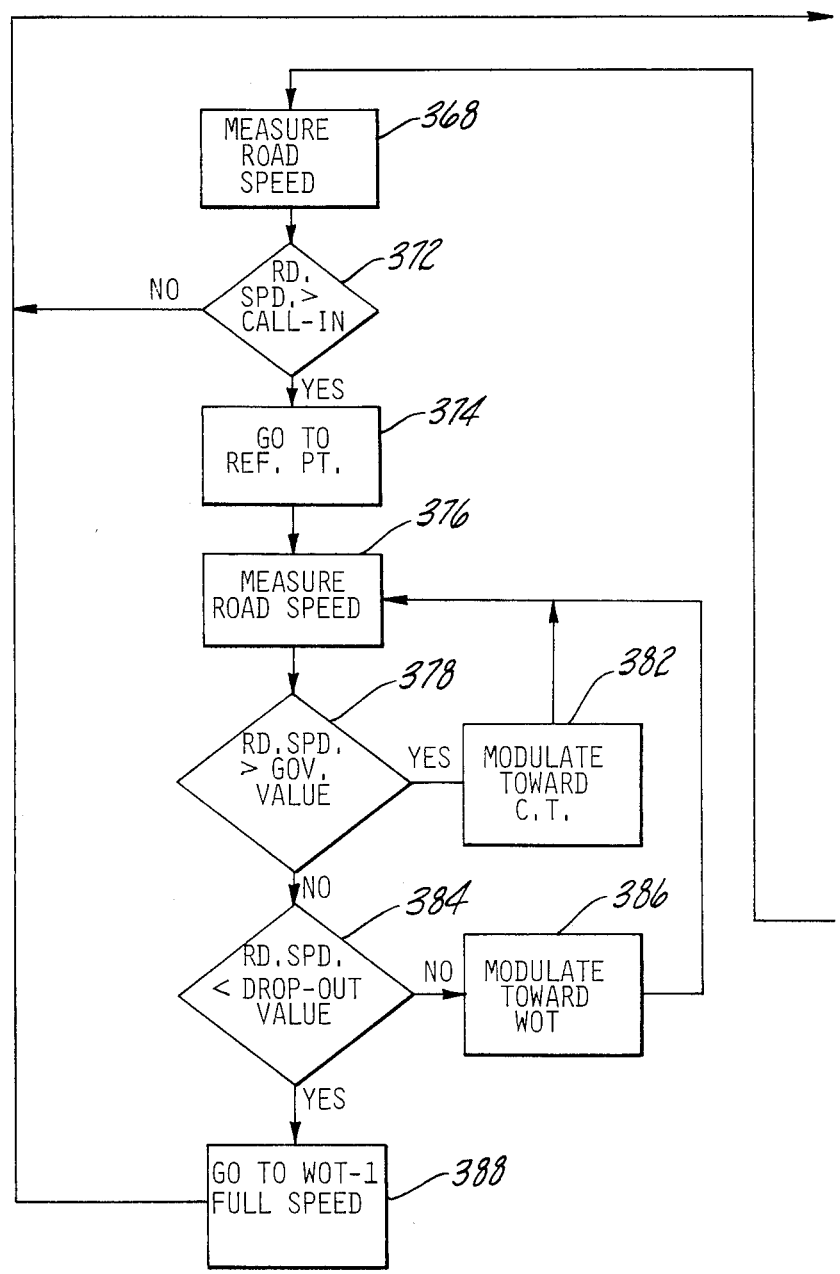
Figure 8B:
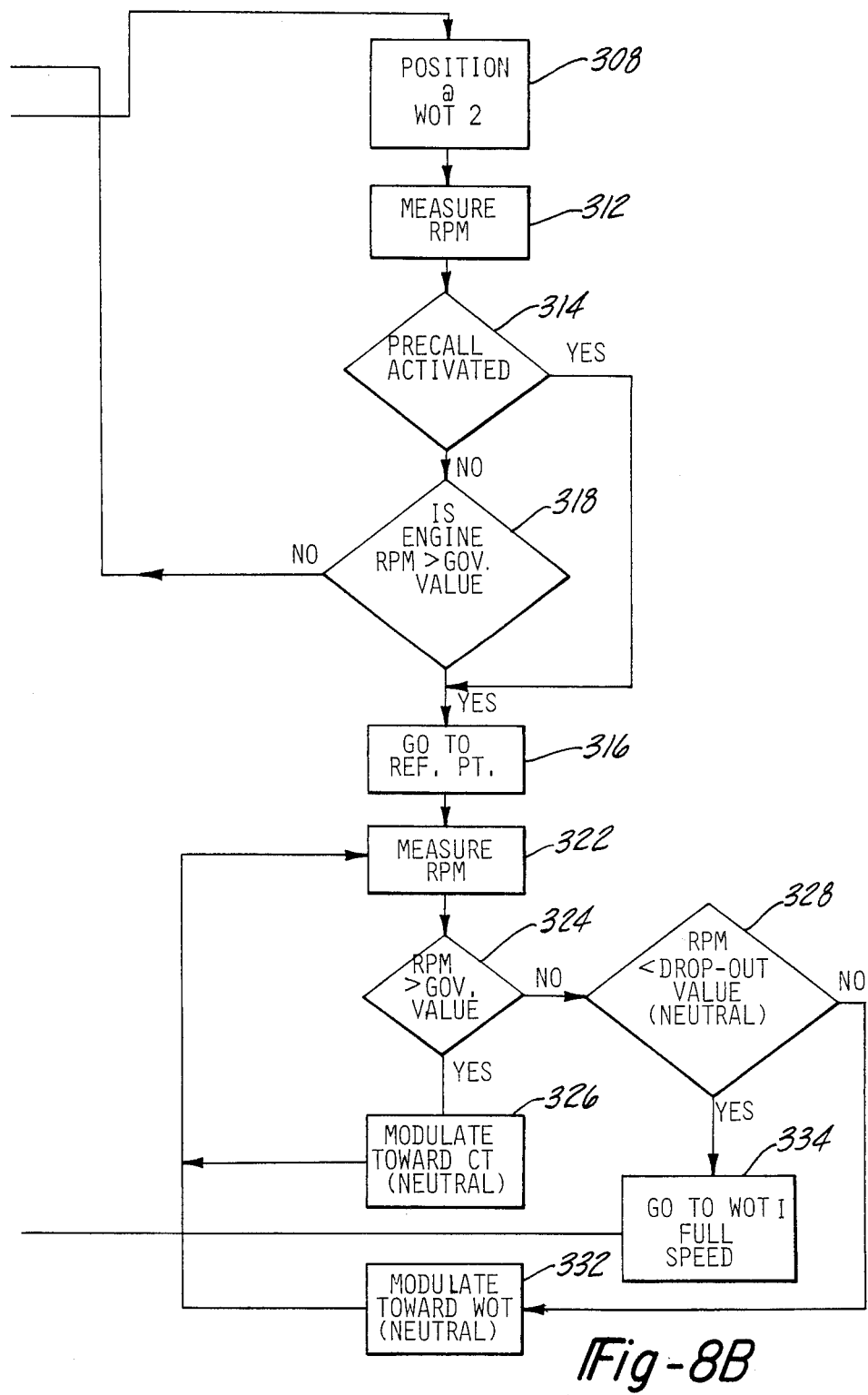

The operation of the governor will be described with reference to the flow chart which is shown in three parts in FIGS. 8A, 8 and 8B, respectively. (The drawing sheets containing FIGS. 8A, 8 and 8B are to be arranged side-by-side in the order named and the interconnecting lines will match-up to depict the entire flow chart in one view.) In general, FIG. 8 shows an initializing procedure and the engine speed governing mode, FIG. 8B shows the neutral governing mode and FIG. 8A shows the road speed governing mode. The flow chart represents the operating program stored in the read only memory 204 of the microprocessor 202.

The start block 302 (FIG. 8) is operative to power-up the electronic control circuit when the engine ignition is turned on and at the same time the microprocessor is reset for commencing operation. Before the control circuit is poweredup, the actuator member 102 is at the wot-1 position. The test block 304 determines whether the engine is running by comparing the actual engine speed with 250 RPM, a value lower than the lowest idle speed of the engine. If the answer is no, meaning that the engine is running, the program advances to test block 306 which determines whether the road speed signal is zero. A yes answer signifies that the vehicle is at standstill with the engine running, the transmission is in neutral and the neutral governing mode operation is called for. Accordingly, the program advances from the test block 306 to the block 308 (FIG. 8B) which calls for the actuating member 102 to be positioned at the wot-2 position. Accordingly, the wot signal from the microprocessor pin 36 goes low and the motor 62 is energized in the close throttle direction. The motor is thus energized to move the actuator member 102 until the bridging contact 134 engages the wot-2 contact. This produces a wot-2 signal at pin 34 of the microprocessor which switches the motor control signals to stop the motor at the wot-2 position.

With the transmission in neutral and the engine in an unloaded condition, it is more susceptible to overspeed, such as by the driver pushing the accelerator pedal to the floor. With the actuator member 102 in the wot-2 position, it is in an advanced location so that it can move on to fully closed throttle in short time in the event of a sudden overspeed. After the actuator member 102 is moved to the wot-2 position, as called for by the block 308, the program advances to block 312 which calls for a measurement of the engine speed. This is effected by activating the interrupt pin 6 and the microprocessor computes the instantaneous engine speed and processes the engine speed signal. The program then advances to the test block 314 which calls for the engine speed signal to be processed to determine whether the engine acceleration exceeds a predetermined value. The predetermined acceleration value, for example, occurs if the engine speed increases from 1800 RPM to 2100 RPM in a period less than 250 milliseconds. If the test block 314 determines that the predetermined acceleration value, known as the precall value, is exceeded, i.e. the precall is activated and the program advances to block 316. This precall procedure enables an early determination of impending engine overspeed so that timely correction can be made. If, on the other hand, the test block 314 determines that the precall value is not exceeded, the program advances to the test block 318. The test block 318 determines whether the engine speed is above the governed value, for example, 4300 RPM. If it is not then the program returns to the test block 304. If the engine speed is above the governed value, the program advances to the block 316.

Block 316 calls for the actuator member 102 to be moved at high speed to the reference point so that the actuator member is positioned in a more advanced position relative to the close throttle position and is in a position to exercise smooth governing action on the engine speed. When the actuator member 102 reaches the reference point the bridging contact 134 engages the reference contact 128 and a reference point signal is supplied to pin 39 of the microprocessor. This causes the system to enter the reference point governing mode and the microprocessor, under program control, produces slow speed motor control signals for moving the actuator member 102 at slow speed within a small range above and below the reference point. The program then advances to the block 322 which calls for measurement of engine speed. Then the program advances to the test block 324 which determines whether the engine speed is greater than the governed value. If the answer is yes, the program advances to the block 326 which calls for the microprocessor, under program control, to produce a slow or modulated close throttle signal at the microprocessor pin 35. Accordingly, the motor is energized for slow operation in the close throttle direction to move the actuator member 102 to reduce the throttle opening and hence the engine speed. The program then returns to the block 322 which causes another engine speed measurement to be taken. If the engine speed, as determined by test block 324, remains at a value greater than the governed value, the program advances through blocks 326 and 322 to the test block 324 once again.

If the test block 324 determines that the engine speed is less than the governed value, the program advances to the test block 328 which determines whether the engine speed is less than a drop-out value, for example, 350 RPM. Such a low engine speed signifies that the engine speed is so far below the over speed value that further governing for the time being is no longer necessary. If the test block 328 determines that the engine speed is above the drop-out value, the program advances to block 332 which calls for the microprocessor, under program control, to cause the motor to be energized at slow or modulated speed toward the wide open throttle position. The program then returns to the block 322 for another engine speed measurement. The program then advances through the test block 324 as previously described. If it is determined at test block 328 that the engine speed is below the drop-out value, the program advances to block 334 which calls for the microprocessor to produce a wot signal on pin 35 to energize the motor at full speed to move the actuator member 102 to the wot-1 position. When the wot-1 position is reached, the switching contact 134 engages the wot-1 contact 118 and the motor is stopped with the actuator member in the wot-1 position. When the program returns to the test block 304 it determines whether the engine is running, i.e. is the speed less than 250 RPM. If it is not, the program advances to the test block 306 which determines whether the road speed is zero. If so, the neutral mode of governor operation is invoked once again and the program loop just described is repeated.

If test block 304 determines that the engine speed is not less than 250 RPM, the program advances to block 306 and if the road speed is not zero, as determined by test block 306, then it is known that the transmission is in gear with the engine running and the neutral governing mode is by-passed and the program proceeds to block 336. The block 336 calls for the microprocessor, under program control, to produce a wot signal on pin 36 to energize the motor at high speed to move the actuator member 102 to the wot-1 position. The governor may proceed in its operation from this point to enter either the engine governing mode or the road speed governing mode depending upon operating conditions as described below.

With the actuator member positioned at the wot-1 position, as called for by block 336, the program then advances to block 338 which calls for a measurement of engine speed. The program proceeds to the test block 342 which determines whether the precall is activated signifying an excessive engine acceleration. If the answer is yes, the program advances to block 344; if the answer is no, it proceeds to the test block 346. Block 346 determines whether the engine speed is greater than the predetermined call-in value which is an engine speed below but sufficiently close to the governed speed of the engine so that engine governing is required to ensure against overspeeding. The engine speed call-in value is for example, 275 RPM below the governed speed of 4300 RPM. If the answer to the test block 346 shows that engine speed is greater than the call-in value, the program proceeds to block 344 and thus enters the engine governing mode.

The operation of the governor in the engine governing mode includes a program sequence represented by blocks 352, 356, 358, 362 and 364. This program sequence is identical to the program sequence described for the neutral mode of operation with respect to blocks 322, 324, 326, 328, 332 and 334, in the preceding description. Thus, the description of this operation will not be repeated. It is noted, however, that the program exits from the engine governing mode at block 364 when the engine speed is less than the drop-out value. In this event, the program returns from block 364 to the test block 304. Thus, the program may advance from test block 304, as previously described to test block 306 and thence enter the neutral engine governing mode as previously described. Alternatively, the program may advance from test block 304 to block 336 and thence through blocks 338 and 342 to the test block 346, as previously described. If test block 346 determines that the engine speed is greater than the call-in value, then the program will proceed to block 344 and reenter the engine governing mode, as previously described; however, if test block 346 determines that the engine speed is less than the call-in value, the program will enter the road speed governing mode by proceeding to block 368.

In the road speed governing mode, block 368 calls for a measurement of road speed. The test block 372 then determines whether the road speed is greater than a call-in value, for example, 2 miles per hour below the governed speed of 55 miles per hour. If not, there is no need for road speed governing and the program returns from block 372 to the test block 304 to start the program execution over again. If on the other hand, test block 372 determines that the road speed is above the call-in speed the program advances to the block 374 which calls for the microprocessor to produce a close throttle signal on pin 35 to energize the motor at high speed in the close throttle direction to advance from the wot-1 position to the reference point. With the actuator member 102 at the reference point, the program proceeds to block 376 which calls for a measurement of road speed. From the block 376, the program proceeds to the test block 378 which determines whether the road speed is greater than the governed value. If it is, the program proceeds to the block 382 which calls for the microprocessor to produce a close throttle signal on pin 35 which energizes the motor at slow speed in the close throttle direction. The program then returns to the block 376 for another measurement of road speed. If the road speed continues to be higher than the governed value, block 382 is operative to cause the motor to continue operation at slow speed in the close throttle direction. If block 378 determines that the road speed is not greater than the governed value the program proceeds to the test block 384. This block determines whether the road speed is less than the drop-out value, for example, 4 miles per hour less than the governed speed. If it is not, the program proceeds to block 386 which calls for the microprocessor to produce a wot signal on pin 36 to energize the motor at slow speed in the wide open throttle direction. The program then returns to block 376 for another measurement of road speed. The program then proceeds to test block 378 and when it is determined by block 378 that the road speed is less than the governed value and it is determined by block 384 that the road speed is less than the drop-out value, the program will proceed to block 388. Block 388 calls for the microprocessor to produce a wot signal on pin 36 which will energize the motor at full speed in the wide open throttle direction. When the motor reaches the wot-1 position, the bridging contact 134 engages the wot-1 contact 118 and the motor is stopped in the wot-1 position. The program then loops back from block 388 to the test block 304 and the program is executed again in the same manner as described above.

As described above, the motor 62 is operated at "full speed" (sometimes referred to as high or maximum speed) by the programmed control of the microprocessor, under certain operating conditions of the vehicle. Further, as described above, the motor 62 is operated at "slow speed" by the programmed control of the microprocessor under certain vehicle operating conditions. These terms, "full speed" and "slow speed", have been used to facilitate the explanation of the governor. The term "full speed" as used herein, means the maximum speed available from the motor 62 when it is energized with an unmodulated control signal. In order to obtain the desired maximum motor speed and still use the smallest feasible motor size, the motor is operated at about one and one-half times its rated voltage. In particular, the motor 62 is rated for 7.5 volts unmodulated supply voltage and it is supplied from a nominal 12 volt source. The motor is capable of withstanding this overvoltage because the governor operation requires only intermittent full speed operation and, when operated at slow speed, it is pulse rate modulated, so that the motor has a low duty cycle. The term "low speed" as used in the preceding description and that which follows, is used in a generic sense to distinguish it from "full speed" and also to mean a particular range of speeds which will be defined subsequently.

The microprocessor 212 is programmed to produce motor control signals, i.e. the wot signal at pin 36 and the CT signal at pin 35, which will energize the motor at selectively different speeds according to operating conditions. Speed control is provided primarily by pulse rate modulated motor control signals and in certain conditions pulse width modulation may be used in conjunction with pulse rate modulation. In governor operation there are operating conditions in which full speed motor operation is desired, i.e. the motor is to be operated at its maximum speed. The full speed motor operation is obtained by causing the microprocessor to produce an unmodulated wot signal on pin 36 or an unmodulated CT signal on pin 35, as the case may be. Low speed, as required by different operating conditions, is obtained by causing the microprocessor to produce a modulated wot signal on pin 36 or a modulated CT signal on pin 35. The slow speed of motor operation is different when the governor is operated in the neutral mode, the engine governing mode and the road speed governing mode, as will be described below.

As described above, the neutral mode of governor operation is invoked when the engine is running without a load. In this operating condition, the actuating member 102 is moved first to the wot-2 position so that in this advanced or head-start position, it can quickly reach the reference point which corresponds approximately to a half-open throttle. This enables quick response to sudden overspeed. Then after precall is activated or if engine speed is greater than governed speed, the activating member 102 moves at full speed to the reference point. This initiates the reference point governing mode to obtain "smooth governing" which will be described subsequently. It is desirable in this governing action to use a slow motor speed and to effect governing with very small excursions of the actuating member 102 from the reference point. For this purpose, the slow speed for the neutral mode, called the "neutral mode slow speed", is achieved by pulse rate modulation of the wot signal with an off-time of 637 milliseconds and an off-time for the CT signal of 500 milliseconds. The on-time for the CT signal is 12.5 milliseconds and the on-time for the wot signal is 7.5 milliseconds. (The difference in the modulating time is provided to compensate for the throttle return spring force on the actuator member and provide about the same speed of movement in both directions.)

The engine speed governing mode is invoked if either the precall is activated or if the engine speed is above the call-in value, say 275 RPM below the governed engine speed. Either of these conditions causes the actuating member 102 to be moved at full speed to the reference point. This initiates the reference point governing mode to obtain "smooth governing" which will be described subsequently.

In the engine speed governing mode, the slow speed is somewhat higher than the slow speed for neutral governing mode and is known as the "engine governing mode low speed". This low speed is obtained by a wot signal with the off-time of 637 milliseconds and a CT signal with an off-time of 100 milliseconds. The on-time is 12.5 milliseconds for both.

The road speed governing mode, as described above, is invoked when the vehicle is running at road speed and the engine speed is less than the call-in value, assuming the precall was not activated. The system goes into the road speed governing mode when the road speed increases above the call-in value, say 2 miles per hour below governed speed, and it remains in this mode unless the speed decreases below the drop-out value, say 4 miles per hour below governed speed. Upon reaching call-in speed, the actuator member 102 will be moved at full speed to the reference point. This initiates the reference point governing mode to obtain "smooth governing" which will be described subsequently. In the road speed governing mode, several different values of slow speed are used to obtain the desired governing action. In general, there is a different slow speed for each of several speed bands or windows encompassing the governed speed. These different slow speeds and the associated speed band are as follows: First, there is a deadband encompassing the governed speed which is approximately 1 mile per hour wide and with a governed speed of say 55 miles per hour the deadband would extend from 54.5 to 55.5 miles per hour. In the deadband, the microprocessor produces motor control signals which shut-off the motor and thus, in this band, the actuator member 102 is at a standstill. This is referred to herein as the "deadband slow speed". Next, there is a band #1 which is approximately 2 miles per hour wide and is effective from 54.0 to 54.5 miles per hour and from 55.5 to 56.0 miles per hour. In band #1 the slow speed is produced by one-shot of pulse modulation of the motor control signals for a fixed time interval, say an interval of 320 milliseconds and it is not repeated while the speed remains in band #1. This pulse modulation has an off-time of 15 milliseconds for the CT signal, an off-time of 50 milliseconds for the wot signal and an on-time of 12.5 milliseconds for both. This low speed is called the "band #1 low speed". Next, there is a band #2 which is approximately 7 miles per hour wide and is effective from 53.0 to 54.0 miles per hour and from 56.0 to 57.0 miles per hour. For band #2, the slow speed of the motor is produced by intermittent modulation in which a modulated signal is produced for a period of 125 milliseconds followed by no signal for a period of 250 milliseconds and so on, alternately. The modulated signal has an off-time of 15 milliseconds for the CT signal and an off-time of 50 milliseconds for the wot signal, both having an on-time of 12.5 milliseconds. (This modulation rate is referred to as "regular modulation".) This slow speed of motor operation is referred to as "band #2 slow speed". Next, there is a band #3 which extends between the drop-out value, say 4 miles per hour below governed speed, and the overspeed value, say 4 miles per hour above governed speed. This is effective from 51 miles per hour to 53.0 miles per hour and from 56 miles per hour to 59 miles per hour. In band #3, the motor control signals are produced by the regular modulation referred to above. This low speed is referred to as "band #3 low speed".

The governor operates in the neutral governing mode, as described above, when the engine is running in an unloaded condition. The actuator 102 is moved at full speed from the wot-1 position to wot-2. It then moves at full speed from the wot-2 position to the reference point. In the reference point governing mode, the motor 62 is energized for operation at the "neutral governing mode slow speed", as defined above. This slow speed of motor operation causes the actuator member 102 to displace the throttle plate 16 at such a rate and over limited excursions that "smooth governing", as will be described subsequently, is achieved. This reference point governing mode continues until the engine speed falls below the drop-out value, as previously described, such as would occur when the driver shifts the vehicle into gear.

Operation of the governor in the engine governing mode is most likely to occur when the vehicle is being accelerated in low gear; for example, the driver may be accelerating with the throttle fully depressed and either the precall may be activated or the engine speed may exceed the governed value. Thus, the actuator member 102 moves at full speed from the wot-1 position to the reference point. In the reference point governing mode, the motor 62 is energized for operation at the "engine governing mode slow speed", as defined above. This slow speed of motor operation causes the actuator member 102 to displace the throttle plate 16 at such a rate and over such limited excursions that "smooth governing", as will be described subsequently, is achieved. This reference point governing mode continues until the engine speed falls below the drop-out value, as previously described, such as would occur when the driver shifts the vehicle to the next gear.

The governor is operated in the road speed governing mode, as described above, when the vehicle is being driven with the transmission in high gear at highway speed. The driver may accelerate to the governed speed by depressing the accelerator pedal, in some cases by depressing it to the floor. In this operating condition, when the road speed exceeds the call-in speed the motor 62 is energized at full speed to move the actuator 102 to the reference point. This places the governor in the reference point modulation mode. In this mode, the motor may be operated at any one of the four different slow speeds, namely deadband slow speed, band #1 slow speed, band #2 slow speed, and band #3 slow speed, as defined above. The selected slow speed will be that corresponding to the speed band nearest the governed speed in which the measured road speed falls. Thus, if the measured road speed falls within the deadband, the motor is operated at the deadband low speed. If the measured speed falls outside the deadband but within band #1, the motor is operated at band #1 slow speed, and so on for the other speed bands. These motor speeds are of such value that the reference point governing mode produces "smooth governing" as defined below. The reference point governing mode continues until the road speed decreases below the drop-out value which may occur by reason of the driver letting up on the accelerator pedal or by any combination of driving conditions such as a steep grade or a strong headwind.

The term "smooth governing" as used herein, means that the engine speed or road speed, as the case may be, is brought to a certain degree of steady state operation at the governed value by alternate excursions of overshoot and droop in excursions of small magnitude and of short time duration. In particular, the first overshoot does not exceed 3 per cent of the governed speed and the time duration is less than 3 seconds. The following droop does not exceed 1 per cent of the governed speed and the time duration is less than 2 seconds. Subsequent to the droop, the speed excursions from the governed value do not exceed 0.7 per cent of the governed value. It is assumed, for purposes of determining this governing action, that the driver's control and the vehicle operating conditions remain unchanged. This smooth governing is achieved by the slow speed motor operation in the reference point governing mode. In particular, the motor, and hence the actuator member, is operated at speeds sufficiently slow so that the change of throttle effect does not get ahead of the change in engine speed, i.e. the movement of the throttle never exceeds that required to take the engine or road speed to the governed value within the limits of overshoot defined above. As used herein, the term "slow speed" means a speed slow enough that the overriding throttle limiting means will move from its position at the time of speed measurement to a new position in a time interval at least as great as that required for the measured speed to change from its value corresponding to the position of the overriding throttle limiting means at the time of speed measurement to a new value corresponding to said new position of the overriding throttle limiting means.

This is accomplished by movement of the throttle plate at the following rates:

Neutral governing mode slow speed: 0.093 radians in 12 seconds (0.00775 radians per second) which is 0.56% of total travel per second.

Engine speed governing mode slow speed: 0.093 radians in 28 seconds (0.033 radians per second) which is 2.39% of total travel per second.

Road speed governing mode:
  Deadband: No movement.
  Band #1: 0.093 radians in 0.8 seconds (0.116 radians per second) which is 8.4% of total travel per second.
  Band #2: Same as Band #1.
  Band #3: 0.093 radians per 0.1 seconds (0.93 radians per second) which is 67% of total travel per second.

Full speed: 0.093 radians in 0.053 seconds (1.75 radians per second) which is 126% of total travel per second.

This smooth governing has been achieved with the governor of this invention on the following vehicles: 1982 GMC model 8.2 L engine (350, 366 and 292 CID) as used on GM pickup, medium and heavy duty trucks; 1982 model Detroit Diesel/Allison on Ford trucks; 1982 model Ford (6-cylinder 300 and 460 CID, 8-cylinder, 330 and 370 CID) on Ford pickup, medium and heavy duty trucks.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. The method of operating a governor for an internal combustion engine which has a throttle movable between an open throttle position and a close throttle position for regulating the flow of fuel to the engine, said governor being of the type comprising an overriding throttle closing means for limiting the movement of the throttle in the open throttle direction, said engine being drivingly coupled with a device which is to be governed at a predetermined governed speed and having a speed with a known relationship to the speed of the engine, said method comprising the steps of:

moving the overriding throttle limiting means to a reference position when the measured speed exceeds a predetermined value, said overriding throttle limiting means limiting the throttle position to a predetermined throttle position when in the reference position, moving the overriding throttle limiting means at a predetermined slow speed in the close throttle direction when the speed is greater than the governed speed, moving the overriding throttle limiting means at said slow speed in the open throttle direction when the speed is less than the governed speed, said slow speed being slow enough that the overriding throttle limiting means will move from its position at the time of speed measurement to a new position in a time interval at least as great as that required for the measured speed to change from its value corresponding to the position of the overriding throttle limiting means at the time of speed measurement to a new value corresponding to said new position of the overriding throttle limiting means.

2. The invention as defined in claim 1 wherein said slow speed is not greater than about one radian per second.

3. The invention as defined in claim 1 wherein the device which is to be governed is the engine with the engine running in a no load condition, and wherein said slow speed is not greater than about 0.05 radians per second.

4. The invention as defined in claim 1 wherein the device which is to be governed is the engine with the engine running in a loaded condition, and wherein said slow speed is not greater than about one radian per second.

5. The invention as defined in claim 1 wherein the device to be governed is a vehicle driven by said engine with said engine running in a loaded condition, and wherein said slow speed is not greater than about one radian per second.

6. The invention as defined in claim 2 wherein moving of the overriding throttle limiting means to the reference position is effected at a speed greater than 1.5 radians per second.

7. The invention as defined in claim 1 wherein moving the override throttle limiting means to the reference position is done at a speed which is about twice as fast as the greatest value of slow speed.

8. In an engine and load speed governor for an engine having a throttle movable between an open throttle position and a close throttle position for regulating the flow of fuel to the engine, said governor being of the type comprising an overriding throttle closing means, a control means including engine speed sensing means, load speed sensing means and actuating means for moving said throttle closing means to a position for limiting the engine speed and load speed to predetermined governed values, the improvement wherein said control means comprises:

an engine speed signal generating means for producing an electrical signal corresponding to engine speed, a load speed signal generating means for producing an electrical signal corresponding to load speed, said actuating means including a reversible electric motor coupled with the overriding throttle closing means and being responsive to motor control signals for energizing the motor in the close throttle direction or in the open throttle direction, electronic logic means responsive to the engine speed signal and the load speed signal for producing motor control signals for slow speed or full speed motor operation in the close throttle or open throttle directions, said logic means being responsive to said speed signals, when one of said speed signals is greater than a predetermined value, for producing a full speed motor control signal in the close throttle direction, said control means including means for producing a reference signal when the overriding throttle closing means reaches a reference position, said logic means being responsive to the reference signal and to the speed signals for producing motor control signals for slow speed operation for moving the overriding throttle closing means so as to limit the engine speed or the load speed, as the case may be, to the respective governed value.

9. The invention as defined in claim 8 wherein, said logic means is responsive to said engine running in an unloaded condition for producing motor control signals for full speed operation of the motor in the closed throttle direction to an intermediate open throttle position between the wide open throttle position and the reference position, said logic means being responsive to engine speed greater than the governed speed for producing motor control signals for full speed motor operation in the close throttle direction to the reference position, whereby the overriding throttle limiting means is moved quickly to the reference position for engine speed governing when the engine is running in an unloaded condition.

10. The invention as defined in claim 9 wherein, said logic means is responsive to a predetermined value of acceleration of the engine for producing motor control signals for full speed motor operation in the close throttle direction to the reference position.

11. The invention as defined in claim 8 wherein, said logic means is responsive when said engine is running in a loaded condition and when said one of said speed signals is the engine speed signal, for producing a full speed motor control signal in the close throttle direction, said predetermined value being the call-in value of engine speed, whereby the overriding throttle control means is moved to the reference position when the engine speed exceeds the engine call-in value when running in a loaded condition.

12. The invention as defined in claim 8 wherein, said logic means is responsive when said engine is running in a loaded condition and when said one of said speed signals is the load speed signal, for producing a full speed motor control signal in the close throttle direction, said predetermined value being the call-in value of load speed, whereby the overriding throttle control means is moved to the reference position when the load speed exceeds the road speed call-in value.

* * * * *